UNITED STATES PATENT OFFICE.

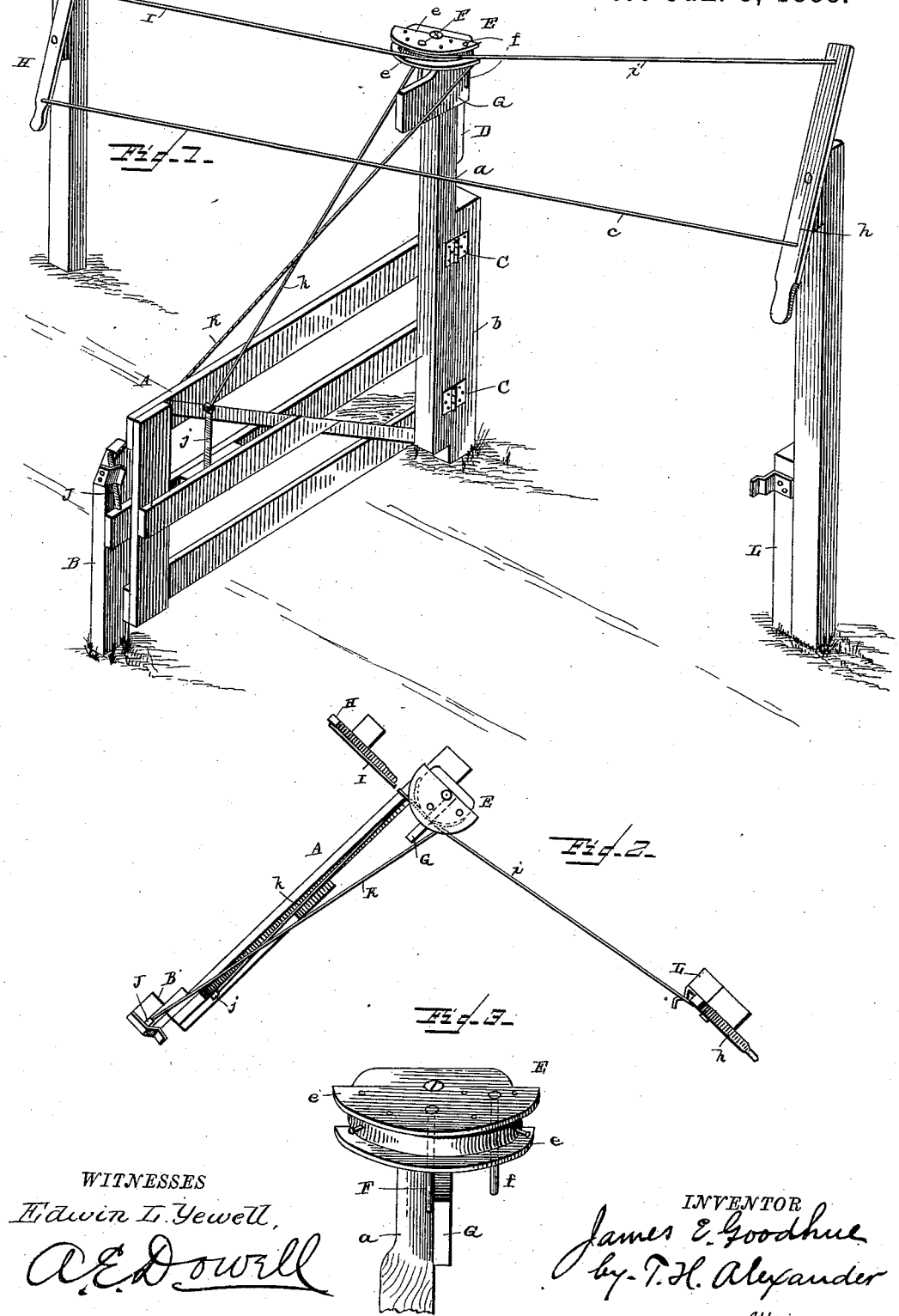

JAMES ELLSWORTH GOODHUE, OF ST. CHARLES, ILLINOIS.

AUTOMATIC GATE.

SPECIFICATION forming part of Letters Patent No. 375,993, dated January 3, 1888.

Application filed August 24, 1887. Serial No. 247,768. (No model.)

*To all whom it may concern:*

Be it known that I, JAMES ELLSWORTH GOODHUE, of St. Charles, in the county of Kane and State of Illinois, have invented certain new and useful Improvements in Automatic Gates; and I do hereby declare that the following is a full, clear, and exact description thereof, reference being had to the accompanying drawings, and to the letters of reference marked thereon, which form part of this specification, in which—

Figure 1 is a view showing my improved gate and its operating devices. Fig. 2 is a plan view of the same. Fig. 3 is a detail view of the pivoted segment.

This invention relates to improvements in swinging gates, which can be automatically opened and closed by means of levers mounted on proper supports at suitable distances from and on each side of the gate, and of suitable connecting devices between said levers and the gate, hereinafter described, illustrated in the drawings, and pointed out in the claims hereto appended.

Referring to the accompanying drawings by letter, A designates the gate proper, which may be of any suitable construction, but has its rear upright, $a$, elongated and rising vertically above the top of the gate a distance corresponding to about one-half or two-thirds of the height of the gate itself.

B designates the outer gate-post, against which the gate is closed, and $b$ designates the inner gate-post, upon which the gate A is mounted by means of hinges C, secured to post $b$ and to the upright $a$ of gate A, as shown. To the upper portion of upright $a$ is secured a bracket, D, which rises to the top of said upright and has pivoted upon it a segment, E, as shown. Instead of using a bracket, D, the segment may be pivoted upon the top of upright $a$, which may be enlarged to support the same properly. The segment E is a flat semicircular disk, and is pivoted at a point which would be about the center of the complete disk of which the segment is formed. The rounded periphery of said segment is grooved, for a purpose hereinafter shown. The segment is pivoted in such manner that its periphery lies and moves in a horizontal plane.

$e\ e$ designate metallic plates, which are respectively secured to the upper and under surfaces of segment E, and project slightly beyond the curved edge of the same, so as to increase the depth of the groove on said edge and to protect the segment from wear.

F $f$ designate pins or arms depending from segment E, near its outer rounded periphery. The pin F is at about the center of the rounded periphery of the segment, while pin $f$ is near one corner of the same, on the side to which the gate turns in opening, as shown. The upright $a$ is rounded at one upper edge to permit free play of the pin F as the segment is turned.

G designates a horizontal arm secured to upright $a$, and standing forward and outward therefrom in a parallel line with the horizontal bars of the gate. This arm G stands between the pins F $f$ on the segment E.

H $h$ designate levers pivoted about centrally upon suitable posts or other supports on each side of the gate, respectively, and about in line with the upright $a$ thereof, and at such distance from the gate as to permit the levers to be operated by a person on horseback or in a vehicle without danger of the horse's being struck by the gate in swinging open. The upper end of lever H is connected by a wire, I, with the corner of segment E nearest lever $h$, which segment stands normally at right angles to the gate, with its rounded face inward, the wire I passing around the groove in said segment and being secured thereto by a pin, a staple, or in other suitable manner.

$i$ designates a wire connecting the upper end of lever $h$ with the corner of segment E nearest lever H, and passing around the groove in said segment and secured thereto similarly to the wire I of lever H. The two wires thus pass each other in the groove of segment E, running in opposite directions. The lower ends of levers H $h$ are connected by a wire, $c$, so that the movement of one lever will impart a corresponding degree of movement to the other.

J $j$ designate upright spring-catches arranged on opposite sides of the gate, the catch J being arranged to engage a suitable keeper on the post B when the gate is shut, and the catch $j$ being adapted similarly to engage a keeper on a post, L, situated at the side of the road to which the gate opens. The upper end of catch J is connected by a wire, K, with the corner of segment E on the opposite side of the gate, and the catch j is similarly connected with the opposite corner of segment E by a wire, k, so that the wires K k cross each other, as shown.

The operation of the device is as follows: When the gate is closed, a person wishing to open the same and approaching from the side to which the gate swings in opening, grasps the lower end of lever h and pushes it inward toward the gate. This movement of the lever causes segment E to turn toward the same by reason of wire i, and this turning causes wire K to pull back catch J and disengage it from its keeper. Further movement of the lever h causes the segment E to turn still more on its pivot toward said lever, and this causes pin F to engage arm G of the upright a, and consequently the gate to turn and open until its movement is stopped by the post L and its catch j engaged by the keeper thereon. After passing through the gate, the lever H is operated in the same manner as described for lever h, causing the wire I to turn segment E in the opposite direction. This movement of the segment E first causes the disengagement of the catch j from its keeper on post L, and causes the engagement of the pin f with the opposite side of arm G, the backward turning of upright a, and consequent closing of the gate. The pins F f are so arranged relatively to arm G that a slight partial rotation is imparted to segment E before they engage said arms sufficient to cause the disengagement of the catches and their retainers. To open the gate from the side of lever H, the lower end of this lever is pushed outward, causing the already described movement of lever h through wire c, and consequent opening of the gate. It is obvious that by the devices described the catches of the gate are released before any force is exerted upon the gate to open or close it. The leverage of pins F f upon the arm G can be regulated by varying their distance from the pivot of the segment, as is evident.

Having described my invention, what I claim as new is—

1. The combination of the gate A, having a rear vertically-extending upright, a, rounded at top, as described, and a horizontal arm, G, secured to the top of said upright above the gate proper, with the semicircular segment E, grooved on its curved periphery and provided with the protecting metallic plates e e, projecting beyond its curved periphery and pivoted to swing horizontally upon the top of upright a above arm G, the pins F f, depending from said segment at points respectively near the center and one corner of the periphery thereof and embracing between them the arm G, and the levers H h, and wires I i and c, for operating said segment and thereby opening or closing the gate, all substantially as and for the purpose described.

2. The combination, with gate A, having a vertically-elongated rear upright, a, by which the gate is hinged to its supporting-post, the spring-catches J j on opposite sides of the gate, and the arm G and bracket D, secured to the top of upright a, of the semicircular segment E, grooved on its periphery and pivoted on the bracket D of upright a above arm G, the pin F, depending from the center of the rounded periphery of segment E, and pin f, depending from one corner thereof, embracing between them arm G, the operating-levers H h, and wires I i, connecting said levers to the opposite corners of the segment E and resting in the groove of said segment, the wire c, connecting the lower end of said levers, and the intersecting wires K k, connecting opposite corners of segment E with catches J j, all constructed and arranged substantially in the manner and for the purpose described.

In testimony that I claim the foregoing as my own I affix my signature in presence of two witnesses.

JAMES ELLSWORTH GOODHUE.

Witnesses:
W. C. HUNT,
F. M. GOODHUE.